June 24, 1958   R. HEIDECKE ET AL   2,839,977
FOCUSING HOOD FOR REFLEX CAMERAS
Filed Jan. 11, 1956

United States Patent Office 2,839,977
Patented June 24, 1958

2,839,977

FOCUSING HOOD FOR REFLEX CAMERAS

Reinhold Heidecke and Wilhelm Knauf, Braunschweig, Germany, assignors to Franke & Heidecke, Fabrik Photographischer Prazisions-Apparate, Braunschweig, Germany, a German firm Application January 11, 1956, Serial No. 558,548

Claims priority, application Germany January 13, 1955

11 Claims. (Cl. 95—47)

This invention relates to a foldable or collapsible focusing hood for a photographic camera, particularly but not exclusively for a camera of the twin lens mirror reflex type.

An object of the invention is the provision of a generally improved and more satisfactory collapsible focusing hood.

Another object is the provision of an improved form of hood which collapses into a reasonably compact form so that the construction may be embodied in a removable and replaceable hood which, when removed from the camera, may be easily and conveniently carried as an accessory.

Still another object is the provision of an improved form of collapsible hood in which, when collapsed, no parts extend down into the camera body but all parts lie above the elevation of the ground glass focusing screen, so that the hood may be easily removed from or replaced on the camera in either collapsed condition or erected condition, and so that when collapsed it occupies a relatively small bulk and may be easily carried.

A further object is the provision of a simple and satisfactory collapsible hood so designed and constructed that part of the area of the focusing screen of the camera may still be observed even when the hood is completely collapsed.

These and other desirable objects may be attained in the manner disclosed as an illustrative embodiment of the invention in the following description and in the accompanying drawings forming a part hereof, in which.

The same reference numerals throughout the several views indicate the same parts.

In many forms of photographic cameras, there is a focusing screen (of ground glass or other suitable material) which is to be observed when focusing the camera and which should be darkened or shielded from excessive light, for most satisfactory focusing. Hoods for surrounding the focusing screen and shielding it from light are already known in various forms, many of which are collapsible. In many of the known forms of collapsible hoods, certain walls of the hood do not fold flat but extend down through a slot into the camera body, when the hood is collapsed. Such forms are not suitable for use as interchangeable and replaceable hoods, because of the large bulk or space occupied by the hood in its collapsed form, when removed from the camera body. Other forms of hoods achieve relatively flat folding when collapsed, but are unsatisfactory for one reason or another, for example being not sufficiently light-tight, or having parts connected in a way likely to get out of order. It is to overcome these various objections that the hood of the present invention has been designed.

Interchangeable and replaceable hoods are desirable because varying requirements of photography require focusing hoods having various different characteristics. For example, one form of hood may be satisfactory for normal amateur use. But if the camera is used in excessively bright light, a longer and more light-tight hood may be needed, which would be of awkward size, however, under normal conditions of use. Again, for special medical photography or scientific photography, other forms of hoods may be desirable. Therefore it is advantageous to have the hood detachable and replaceable, so that the photographer may, for example, carry one camera and possibly two or three different forms of hoods, placing the desired special hood on the camera as occasion arises.

Figure 1:
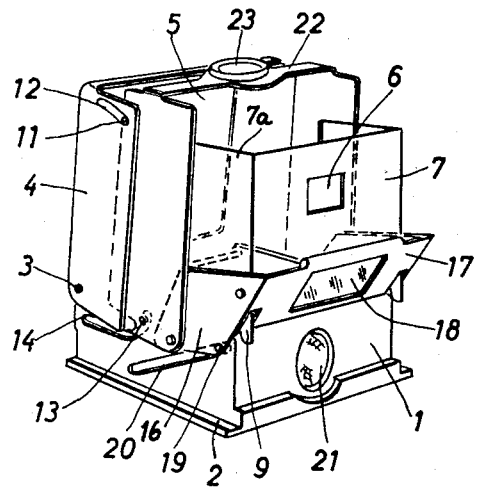
Fig. 1 is a perspective view of one form of hood according to the present invention, in fully erected position, viewed obliquely from the rear and above.
Figure 2:
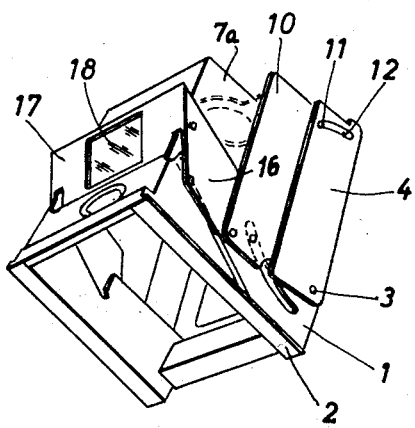
Fig. 2 is a perspective view of the same in erected position, viewed obliquely from below the bottom of the hood.
Figure 3:
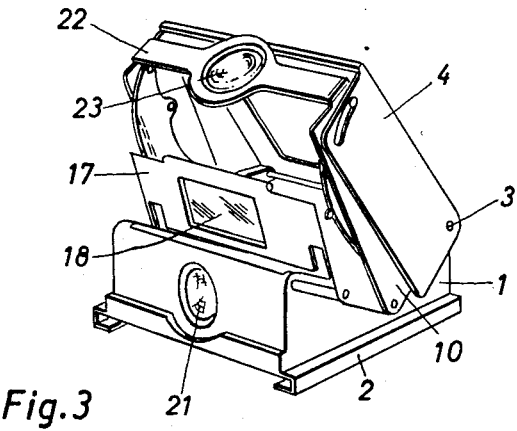
Fig. 3 is a perspective view of the same viewed obliquely from the rear and above the level of the bottom of the hood, showing it in partially collapsed condition.

The detachable and replaceable hood of the present invention, in the first form illustrated in Figs. 1–3, comprises, a stationary base frame 1 having laterally extending flanges or side rails 2, which are adapted to mate with and slide along complementary guideways or side rails on the camera body, along two opposite sides of the focusing screen. Such guideways for receiving the flanges 2 of the hood structure may be provided on any camera having a focusing screen, but the invention is especially though not exclusively intended for a camera of the twin lens reflex type, where the focusing screen is arranged horizontally at the top of the camera body, and where the guideways or grooves for receiving the flanges 2 will be provided at the top of the camera body along two opposite sides of the focusing screen.

Pivoted to the base frame 1 near the front edge thereof, by means of hinge pivots 3, is a front wall section 4 preferably containing a direct view opening 5 for use when a direct view finder is desired. When not used as a direct view finder, the opening side may be closed either by the hand of the operator or preferably by a suitable pivoted wall or panel or door, such as the panel 15 shown in a similar location in U. S. Patent 2,641,955 to Bretthauer.

The rear viewing aperture 6 of the direct view finder is formed in the rear wall 7 of the hood, which rear wall, together with its forwardly extending side wings 7a, is pivoted at 8 to the side wings 16 of a wall 17 as further explained below. The rear wall 7 has downwardly extending lugs or projections 9 which bear on a portion of the stationary frame 1 and serve as actuating levers to swing the rear wall 7 forwardly and downwardly during the collapsing operation, as further mentioned hereafter.

The front wall 4 has side flanges which extend a considerable distance rearwardly, as seen in the drawings, and which constitute the forward parts of the side walls of the hood when the hood is in fully erected position. As above mentioned, the side wings 7a on the rear wall extend forwardly and constitute the rear part of the side walls of the hood. But the side wings on the front wall do not meet the side wings on the rear wall, and to complete the side walls in this gap between the side wings of the walls 4 and 7 there are intermediate side wall members 10, overlapping inside the side wings of the front wall 4 and outside the side wings 7a of the rear wall 7. Each intermediate wall 10 has, near its upper forward corner, a pin 11 projecting laterally outwardly into an arcuate slot 12 in the side wing of the front wall 4, which slot 12 is concentric with the pivot hinge 3 of the front wall 4. Near its bottom, each intermediate side wall 10 has a pin 13 projecting laterally inwardly into a curved slot 14 formed in the stationary frame 1. A little further to the rear, each intermediate side wall 10 also has a pivot pin 15 connecting the intermediate wall to the front end of a forwardly extending lateral wing 16 on an inclined plate 17 which carries near its center a small mirror 18. The pivot 8 of the rear wall 7 is carried by these side wings 16 of the plate 17, near the upper rear corners thereof, and a small spring associated with the pivot 8 tends to swing the rear wall 7 rearwardly and upwardly to its erected position.

These side wings 16 of the plate 17 also have pivot pins 19 which extend into inclined slots or grooves 20 in the side walls of the stationary frame 1.

The low rear wall of the stationary frame 1 is provided with a central aperture having an eyepiece lens 21 therein. Another magnifying lens 23 is mounted centrally in a cross piece 22 which may be formed at the top of the front wall 4 or, preferably, as a cross brace connecting the upper ends of the two intermediate side walls 10, the latter arrangement being illustrated in Figs. 1 and 3.

Figure 4:
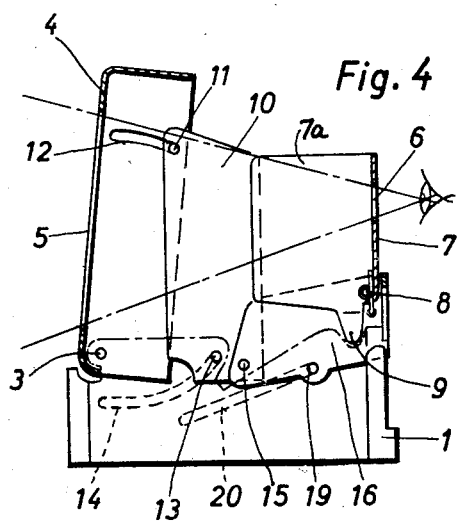
Fig. 4 is a longitudinal vertical section taken approximately centrally through a hood of a slightly modified form, showing it in erected position.

The operation of these parts is as follows: In the fully erected position, the parts assume the position shown in Fig. 1. The side wings on the front wall 4, together with the side wings 7a on the rear wall 7, overlap the intermediate side wall members 10 and exclude light from the sides. When the operator wishes to use the direct view finder features of this hood, he sights forwardly through the sight opening 6 in the rear wall 7 and the large sight opening 5 in the front wall 4, the closure panel of this opening 5 being opened at that time for this purpose. This use of the parts as a direct view finder is approximately as illustrated in Fig. 4, although this figure relates to a slightly modified form of the invention. When the direct view finder is not being used, the closure panel closes the opening 5 in the front wall. The operator may then look straight downwardly into the hood from above, to view the image on the focusing screen at the bottom of the hood, by ordinary viewing. Or he may place his eye above the lens 23 to obtain a magnified view of the image on the focusing screen.

In collapsing the hood, the top edge of the front wall 4 is first tilted rearwardly, toward the position shown in Fig. 3. During the first part of this tilting movement, the pivot pins 11 of the intermediate side walls 10 will slide along the slots 12. When the pins reach the forward ends of these slots, further rearward and downward tilting of the front wall 10 will move the pivots 11 rearwardly and downwardly, and at the same time will force the pins 13 down and forwardly along the curved slots or guides 14, thereby moving the bottom ends of the intermediate side walls 10 forwardly.

Because of the pivotal connection 15 with the side wings 16, the forward motion of the bottom ends of the intermediate walls 10 will also causes corresponding forward motion of the side wings 16, pulling the plate 17 along with them, the parts being guided by the pins 19 in the slots 20. The forward motion of the wings 16 in turn will pull forwardly on the hinge 8 of the rear wall 7, and the extensions 9 thereon will engage with fixed parts of the frame 1 so as to swing the rear wall 7 forwardly and downwardly against the force of the spring which surrounds the hinge 8 and which tends to swing the rear wall 7 to its upright or erect position. The rear wall 7 will thus swing forwardly and downwardly to an approximately horizontal position, and the front wall 4 will swing rearwardly and downwardly to an approximately horizontal position overlying the wall 7, with the intermediate side walls 10 arranged still in vertical planes but tilted approximately 90° from the upright position, so that the long axis of each of these intermediate side walls will lie approximately horizontally. This collapsed position will correspond approximately to the position shown in Fig. 6 with respect to the slightly modified form of the invention.

The collapsing of the walls will also bring the magnifying lens 23 down to a position alined on a horizontal axis with the lens 21, but in front of or inside the lens 21. At the same time, the plate 17 will have been moved forwardly to approximately the center of the hood (that is, approximately over the center of the focusing screen which the hood is intended to surround) and the cooperation of the various pins 13, 15, and 19 with the grooves 14 and 20 will position this wall 17 so that the mirror 18 is inclined at substantially 45° to the horizontal plane of the bottom of the hood frame 1. Therefore, even with the hood in its fully closed position, the operator may still view a portion of the focusing screen by looking forwardly through the now alined lenses 21 and 23 toward the mirror 18, in which he will see a reflection of the portion of the focusing screen which lies beneath this mirror.

In erecting the hood, a reverse operation is accomplished. The top edge of the front wall 4 (which is now the rear edge thereof in its folded or collapsed condition) is lifted upwardly and forwardly, so that the pins 11 lift the intermediate side walls 10 upwardly, which pulls upwardly on the pins 13 and forces them to travel rearwardly up the slots 14, thereby moving the bottom ends of the side walls 10 rearwardly and thereby shifting the plate 17 and its wings 16 rearwardly along the inclined slot 20. This carries the hinge 8 rearwardly, and as soon as the projections 9 pass beyond the necessary fixed or constraining parts of the stationary frame, the spring around the hinge 8 will move the rear wall 7 upwardly to its erect position.

Figure 5:
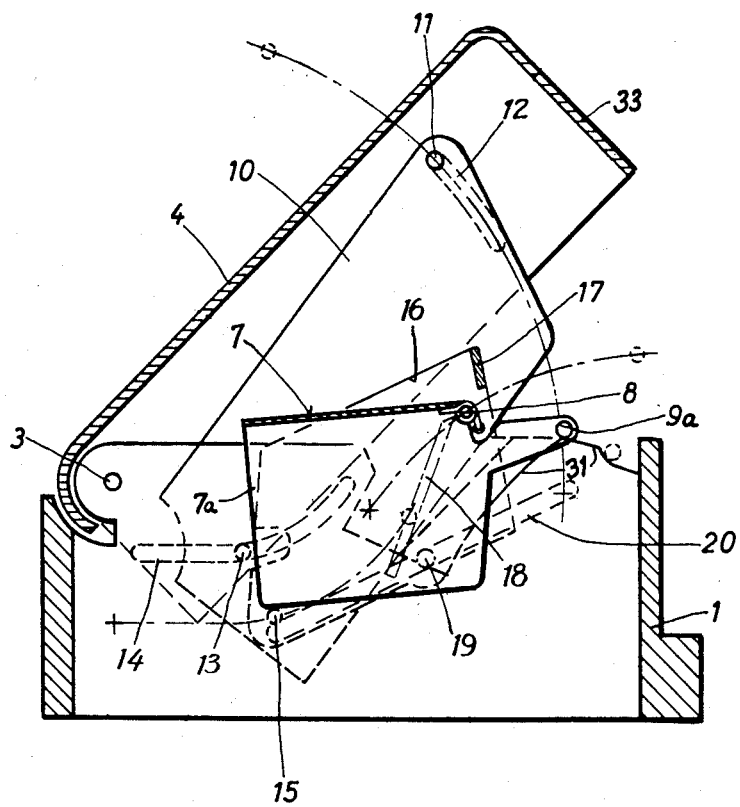
Fig. 5 is a view similar to Fig. 4A showing the parts in an intermediate collapsed position.

In this form of the invention thus far described, the plate 17 carrying the mirror 18 is inclined in its fully erected position, as well seen in Figs. 1 and 2, and so there is a gap left at the rear of the structure between the plate 17 and the lower edge of the rear wall 7, which admits a certain amount of light to the focusing screen. Under many conditions, the amount of light admitted through this gap will not be serious and the construction will be entirely satisfactory. If, however it is desired to reduce even this amount of light, the alternative construction shown in Figs. 4–6 may be employed. In this alternative construction, most of the parts are essentially the same as those in the first form shown in Figs. 1–3, although possibly having minor changes of shape. The corresponding parts in the alternative construction are designated by the same reference numerals used for the respective parts in Figs. 1–3, and so require no further description except to the limited extent set forth below.

Figure 4A:
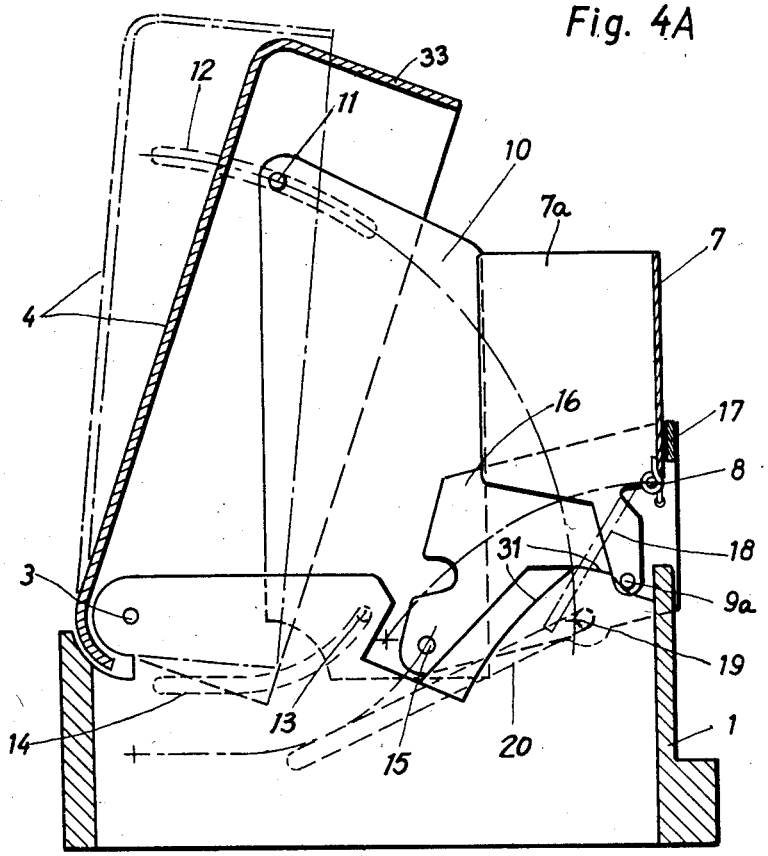
Fig. 4A is a view similar to Fig. 4 but on a larger scale, illustrating in broken lines the fully erected position of the front wall member of the hood and in solid lines the partially collapsed position thereof.
Figure 4B:
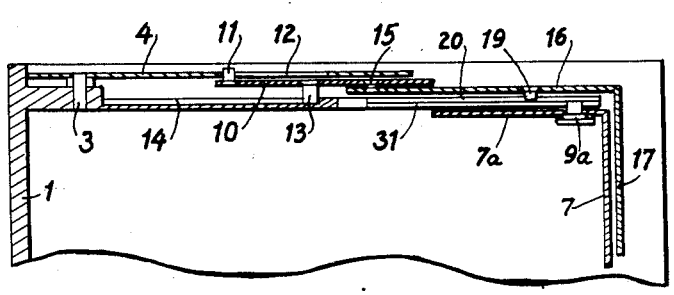
Fig. 4B is a horizontal section through a portion of the hood shown in Figs. 4 and 4A.

The principal difference (except for minor changes of shape, which need not be especially commented upon) is in the plate 17 and mirror 18. In the modified form, the plate 17 is made vertical (in its erected position) instead of being inclined, and the mirror 18 is mounted within the structure, forwardly of the plate 17 and supported crosswise between the side wings 16 of the plate 17. As well seen in Fig. 4A, the mirror 18 is arranged at an angle such that when the parts are fully collapsed as in Fig. 6, this mirror will lie at 45° to the horizontal plane of the bottom edge of the stationary frame 1. It will be noted from Fig. 4A that when the parts are in the erected position, the upper edge of the mirror lies close to the hinge 8 and the lower edge of the rear wall 7, so that any light which enters forwardly through the sight window in the plate 17 is obstructed by the mirror 18 and reflected rearwardly again toward the blackened inner face of the rear wall of the stationary frame 1, thus preventing any great amount of light from reaching the focusing screen at the bottom of the hood assembly.

In this modified form of construction, the pivoting of the rear wall 7 and its side wings 7a is accomplished by pins 9a on downward tails or extensions on the wings 7a, which engage with a cam or guiding surface 31 on the stationary frame 1.

Another difference between this modified form of construction and the form first described is that the cross member 22 which connected the upper ends of the intermediate side walls 10 (as seen in Figs. 1 and 3) is omitted in this instance, and the viewing lens 23, if employed at all, is placed directly in the rearwardly extending top flange 33 of the front wall 4.

Figure 6:
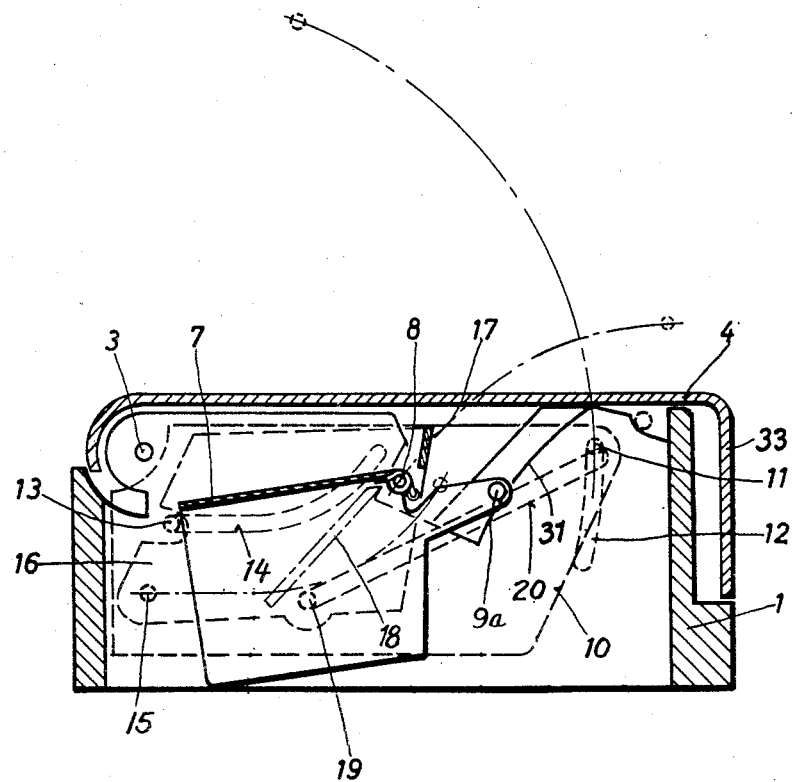
Fig. 6 is a similar view of the same hood in completely collapsed position.

The action of the parts is substantially the same as in the previous embodiment. The first part of the folding movement of the front wall 4 (from the broken line position to the full line position in Fig. 4A) slides the pin 11 along the slot 12 until the front end of the slot is reached. Thereafter, continued downward swinging of the front wall lowers the pin 11, so that the pin 13 slides downwardly and forwardly along the guide 14, shifting the bottom end of the intermediate side wall 10 forwardly and thereby pulling forwardly (through the pivot 15) on the wings 16 and plate 17, likewise pulling forwardly on the hinge 8 of the wall 7, which drags the pins 9a over the cam surface 31 to cause the rear wall 7 to swing forwardly and downwardly to the horizontal position shown in Fig. 5. As the downward swinging of the front wall 4 is continued from the intermediate position shown in Fig. 5 to the fully closed position shown in Fig. 6, the lower end of the intermediate wall 10 moves further forwardly, the parts 7 and 7a are drawn further forwardly, and the mirror 18 associated with the parts 16 and 17 assumes the angular position at 45° as shown in Fig. 6. It may be viewed, even when the hood is fully collapsed or closed, through the lenses 21 and 23, the latter now lying to the rear of or outside the lens 21, rather than in front of or inside it as was the case in the previous embodiment. It will be noted that in both forms of the invention, the lens 23 alone is used for viewing the focusing screen when looking downwardly toward it, but the two lenses 21 and 23 are used in alinement with each other when viewing the focusing screen by means of the mirror 18. This alinement of the two lenses serves to shorten the effective focal length of the lens system to take care of the fact that the viewing distance from the observer's eye to the focusing screen is now considerably less than when viewing from above.

In this modified arrangement, if the space between the mirror 18 and the top edge of the fixed rear wall of the stationary frame 1 still admits too much light, the mirror 18 may be entirely omitted and the viewing opening in the wall 17 may also be omitted, the wall being closed or solid at this point.

Only one intermediate side wall 10 (at each side of the structure) has been shown in both forms of the invention here illustrated. However, it is apparent that if it is desired to reduce still further the overall height of the hood structure when in collapsed condition, the rearwardly extending wings on the front wall 4 can be made narrower, and the forwardly extending wings 7a on the rear wall 7 can be made narrower, and two or more intermediate walls can be used (at each side of the structure) in place of the single intermediate wall 10, the two or more walls being pivotally connected to each other and operating on the same principles and in the same manner as the intermediate wall 10 in the construction illustrated in the drawings.

The various walls of the hood structure are preferably made of thin sheet metal, although thin sheets of other stiff material may be used if desired. It will be noted that in both disclosed forms of the invention, the various sections which together make up the side walls of the hood are mounted to telescope with each other in a somewhat scissor-like manner. All of the various hinges and pivots have axes which are parallel to the main hinge 3 of the front wall 4. Also, this hinge 3 of the front wall is the only hinge which is in fixed position on the stationary frame 1, all of the other hinges or pivotal connections being movable or "floating" relative to the stationary frame, in directions transverse to their axes.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A collapsible and erectable focusing hood for a photographic camera, comprising a hollow four-sided stationary frame, a front wall member hinged to said stationary frame near one side thereof and adapted to be swung on its hinge from an upstanding position forming a front wall of an erected hood structure to a collapsed position lying substantially horizontally across said frame and forming a cover for parts beneath, said front wall member having side flanges extending rearwardly when in erected position to form partial side wall sections, two other side walls each pivotally connected near its upper end to one side flange of said front wall member, and pin and slot guide means connecting each of said other side walls near its lower end to one side of said frame, said guide means being shaped to guide the lower ends of said other side walls forwardly and downwardly as the upper ends thereof are swung rearwardly and downwardly by a swinging motion of said front wall member in a collapsing direction.

2. A collapsible and erectable focusing hood for a photographic camera, comprising a hollow four-sided stationary frame, a front wall member hinged to said stationary frame near one side thereof and adapted to be swung on its hinge from an upstanding position forming a front wall of an erected hood structure to a collapsed position lying substantially horizontally across said frame and forming a cover for parts beneath, said front wall member having side flanges extending rearwardly when in erected position to form partial side wall sections, two other side walls each pivotally connected near its upper end to one side flange of said front wall member, pin and slot guide means connecting each of said other side walls near its lower end to one side of said frame, said guide means being shaped to guide the lower ends of said other side walls forwardly and downwardly as the upper ends thereof are swung rearwardly and downwardly by a swinging motion of said front wall member in a collapsing direction, a rear wall member hinged for swinging movement about a hinge axis substantially parallel to the hinge of said front wall member, and linkage means connecting the hinge of said rear wall member to said other side walls near the lower ends thereof so that as said lower ends move forwardly during downward collapsing swinging of said front wall member, said hinge of said rear wall member will be moved bodily forwardly to carry said rear wall member bodily forwardly with it.

3. A construction as defined in claim 2, further including cooperating engaging means on said rear wall member and said frame for swinging said rear wall member forwardly and downwardly about its hinge while said hinge is moving bodily forwardly.

4. A construction as defined in claim 2, further including a mirror carried by said linkage means connecting the hinge of said rear wall member to said other side walls, said mirror being so positioned that when said linkage is moved forwardly to collapsed position, said mirror will lie at substantially 45 degrees to a horizontal plane at the bottom of said frame and in position to reflect light rays rising vertically toward said mirror horizontally rearwardly toward the rear side of said frame, and an observation opening in the rear side of said frame, through which said mirror may be seen.

5. A construction as defined in claim 4, in which said observation opening in the rear side of said frame contains a viewing lens therein, through which said mirror may be seen when in said collapsed position.

6. A focusing hood comprising a frame, a front wall member hinged to said frame for swinging movement relative thereto from an erect position to a collapsed position, side wall members pivotally connected to said front wall member on pivotal axes extending parallel to the hinge of said front wall member and floatingly pivoted to said frame on pivoted axes also parallel to said hinge, and a rear wall member pivotally connected to said side wall members on pivotal axes also parallel to said hinge.

7. A collapsible and erectable focusing hood comprising a frame having side walls adapted to surround a focusing screen, a plurality of wall members pivotally connected to said frame and to each other for movement from an upstanding position to a collapsed position, a screen viewing lens mounted on said wall members in an elevated position above said screen and with the optical axis of said lens substantially vertical when said wall members are erected, movement of said wall members to collapsed position serving to carry said lens to a position close to said frame and with its optical axis horizontal, a second viewing lens mounted on said frame in a position optically alined with the first viewing lens when in collapsed position, and a mirror located within said frame in oblique relation to the focusing screen and in alinement with the optical axes of said first and second lenses when in collapsed position, so that a portion of the screen may be seen by viewing said mirror through said two lenses when the hood is collapsed.

8. A construction as defined in claim 7, in which said first lens is of a focal length appropriate for viewing the focusing screen vertically downwardly from a substantial elevation above the screen, and in which said second lens is of such focal length that, when used in optical alinement with the first lens when the hood is collapsed, the equivalent focal length of the two lenses in combination is appropriate for viewing said screen at a substantially closer optical distance.

9. A collapsible and erectable focusing hood for a photographic camera, comprising a stationary frame, a front wall structure pivotally mounted near the front edge of said frame to swing rearwardly and downwardly from an upstanding erect position to an approximately horizontal collapsed position overlying and covering said frame, a rear wall structure including a part movable bodily on said frame from a rear erect position forwardly to a collapsed position, two side wall members, one on each side of said frame intermediate said front wall structure and said rear wall structure, pin and slot means connecting each of said side wall members near the bottom thereof with said frame, said pin and slot means being shaped to cause forward movement of the lower portion of each side wall member when the upper portion thereof moves downwardly, a pivotal connection between said front wall structure and the upper portion of each side wall member to cause downward and rearward movement of the upper portion of each side wall member when said front wall structure swings rearwardly and downwardly, thereby causing forward movement of the lower portion of each side wall member through the action of said pin and slot means, and a pivotal connection between said part of said rear wall structure and the lower portion of each side wall member to draw said part of said rear wall structure forwardly toward its collapsed position when the lower portion of each side wall member moves forwardly.

10. A construction as defined in claim 9, in which said rear wall structure includes a second part pivotally mounted on said first mentioned part, spring means tending to swing said second part upwardly from an approximately flat position to an erect position, and interengaging surfaces on said second part and said frame for swinging said second part downwardly against the force of said spring means when said first mentioned part is drawn forwardly by forward motion of the lower portion of said side wall members.

11. A collapsible and erectable focusing hood for a photographic camera, comprising a frame, a front wall structure pivotally mounted on said frame near a front edge thereof to swing rearwardly and downwardly from an erect position to a collapsed position, a rear wall structure including a base part floatingly connected to said frame to move from an erect position near the rear of said frame to a collapsed position closer to the front edge of said frame, said rear wall structure also including a wall part pivotally mounted on said base part to move bodily therewith and also to swing relative thereto from an upstanding erect position to a prone collapsed position, side wall sections between said front wall structure and said rear wall structure, means operated by rearward and downward swinging of said front wall structure for causing rearward and downward movement of the upper portions of said side wall sections and forward movement of the lower portions of said side wall sections, means operated by forward movement of the lower portions of said side wall sections for causing forward movement of said base part of said rear wall structure, and means operated by forward movement of said base part of said rear wall structure for causing pivotal swinging movement of said wall part from erect position to prone position.

References Cited in the file of this patent

UNITED STATES PATENTS

| | | |
|---|---|---|
| 2,641,955 | Bretthauer | June 16, 1953 |

FOREIGN PATENTS

| | | |
|---|---|---|
| 416,359 | Great Britain | Sept. 12, 1934 |
| 621,332 | Great Britain | Nov. 5, 1935 |
| 675,275 | Germany | May 4, 1939 |